2,620,050

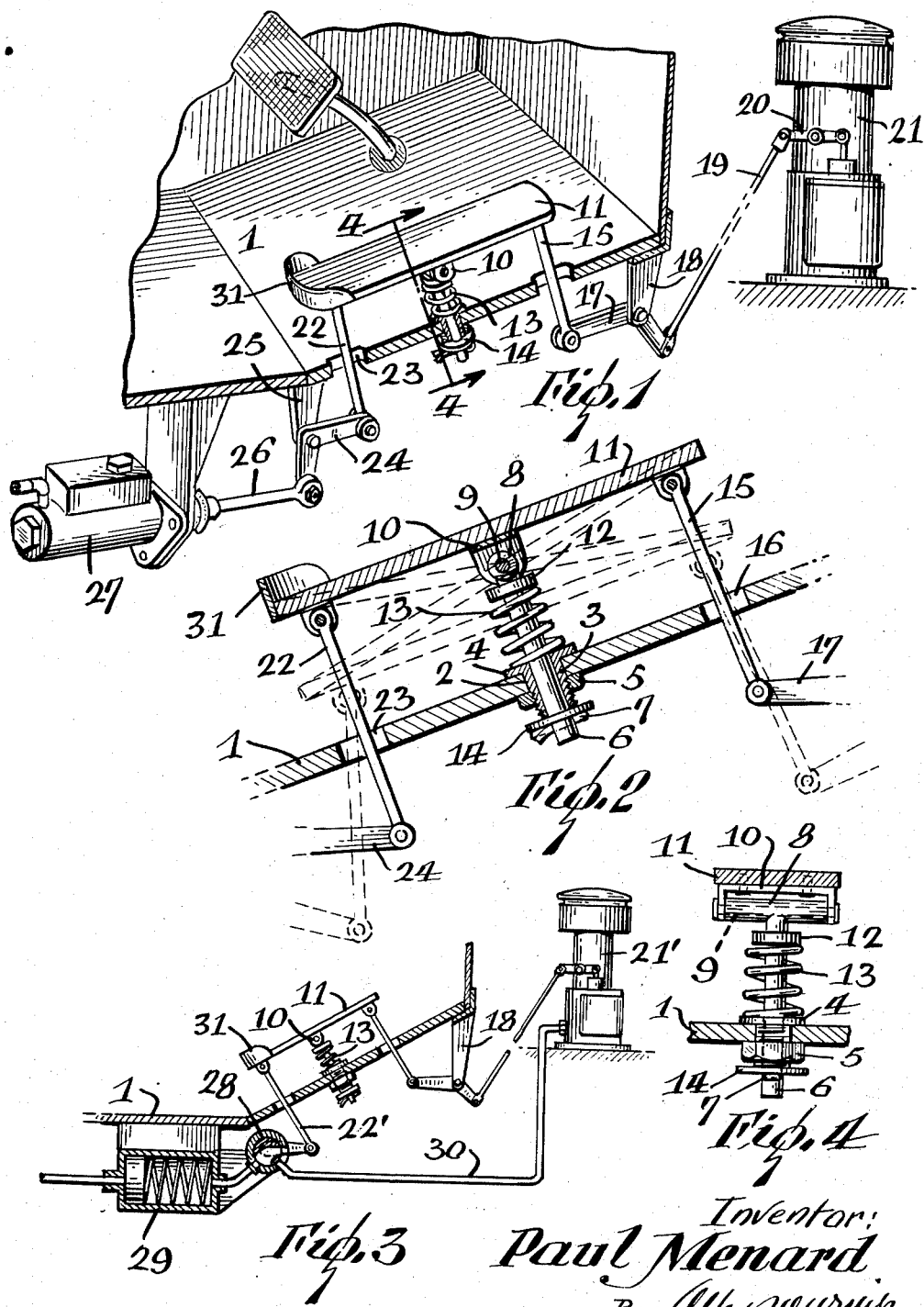
Dec. 2, 1952     P. MÉNARD     2,620,050
SINGLE PEDAL FOR BRAKES AND ACCELERATORS
Filed April 13, 1950
Inventor: Paul Menard
By Attorney Patented Dec. 2, 1952

UNITED STATES PATENT OFFICE 2,620,050

SINGLE PEDAL FOR BRAKES AND ACCELERATORS

Paul Ménard, Lac des Ecorces, Quebec, Canada

Application April 13, 1950, Serial No. 155,584
In Canada April 14, 1949

4 Claims. (Cl. 192—3)

1

The present invention pertains to a novel pedal that can be used for both the accelerator and brakes of a motor vehicle.

The principal object of the invention is to provide a pedal that applies the brakes instantaneously, particularly on a hill, and also permits operation of the accelerator, with the same foot.

Another object of the invention is to provide means whereby the foot is always in position to operate the brakes or accelerator, as desired, particularly on rough roads, where one or the other must be in use at all times. With the invention it is not necessary to shift the foot from one pedal to another, which is difficult on a rough road, but merely to actuate the single pedal in one direction or the other.

Another object of the invention is to provide such a pedal which is easy to operate and which does not tire the foot. A further object is to provide a device that dispenses with the use of the hand brake in starting on a hill and enables such starting without slipping back.

A still further object is to provide a simple and inexpensive construction for performing the stated functions.

In the accomplishment of these objects, the invention comprises a single pedal for the brake and accelerator. The pedal is mounted at its center on a vertically displaceable pivot, and the ends of the pedal are connected respectively to the brake and accelerator. For easier operation, the end connected the brakes may control a servo-brake as used on trucks.

The invention is fully disclosed by way of example in the following description and in the accompanying drawings in which:

Figure 1 is a perspective view, partly in section, of an installation of the invention;

Figure 2 is a vertical section;

Figure 3 is a vertical section of a modification, and

Figure 4 is a section on the line 4—4 of Figure 1.

Reference to these views will now be made by use of like characters which are employed to designate corresponding parts throughout.

In Figures 1 and 2 is shown the floor 1 of a motor vehicle. The floor has an opening 2 to receive a bushing 3 having a head 4 engaging the surface of the floor, while the lower end is threaded to receive a nut 5 engaging the lower surface of the floor. The bushing 3 receives a slidable shaft 6 crossed by a cotter pin 7 below the bushing. The upper end of the shaft has a T-head 8 which is hollow and receives a rod 9. The ends of the rod are supported in a bracket 10 on which

2 is fastened a pedal 11, at the transverse center of the latter. The bracket 10, rod 9 and tube 8 constitute a pivotal mounting that permits either end of the pedal to be depressed, as will be described.

Slightly below the head 8, the shaft 6 has an integral shoulder 12. The shaft is surrounded by a coil spring 13 between the shoulder and the head 4, as shown in Figure 4. Between the pin 7 and the bushing 3, the shaft 6 carries a washer 14 to prevent friction between the pin and bushing.

To the forward end of the pedal is pivotally attached one end of a link 15 passing through a hole 16 in the floor 1. The other end of this link is pivotally attached to a bell crank lever 17 which is pivotally mounted on a bracket 18 on the floor 1. The bell crank lever actuates a link 19 which joins the fuel valve arm 20 of a carburettor 21.

From the rear end of the pedal is pivotally suspended a link 22 passing through a hole 23 in the floor 1. This link is connected to a bell crank lever 24 pivotally mounted on a bracket 25 on the floor. From the lower end of the bell crank 24 extends a rod 26 into the master cylinder 27 of the hydraulic brake system.

In the modification shown in Figure 3, the shaft 22' operates a distributor valve 28 which controls a servo-brake 29 connected to the motor through a suction line 30 leading to the suction side of the carburettor 21'.

In the use of the invention, the right foot of the driver rests on the pedal 11, which preferably has a heel stop 31 at its rear end. When it is desired to accelerate, the driver depresses the forward end of the pedal to operate the shaft 15, lever 17, link 19 and fuel arm 20. If it is desired to apply the brakes, the driver pushes the pedal with his heel to operate the rod 26 and the master cylinder 27. Where a servo-brake 29 is provided, the rod 22' controls the valve 28 thereof.

If the driver wishes to operate the accelerator and the brakes at the same time, he pushes centrally on the pedal to depress both ends thereof and compress the spring 13. The slidable shaft 6 permits both ends of the pedal to descend to operate both rods 15 and 22 at the same time.

Although specific embodiments of the invention have been illustrated and described, it will be understood that various alterations in the details of construction may be made without departing from the scope of the invention as indicated by the appended claims.

What I claim is:

1. A mechanism for operating the brakes and accelerator comprising, in a motor vehicle, a slidably mounted shaft in the floor of the vehicle, a pedal pivotally mounted intermediate its ends upon said shaft, stop means on said shaft below said floor, a spring surrounding said shaft between said floor and pedal, and linkages extending from the ends of said pedal for operating respectively the accelerator valve and the brakes of the vehicle.

2. A mechanism for operating the brakes and accelerator comprising, in a motor vehicle, a slidably mounted shaft in the floor of the vehicle, a pedal pivotally mounted intermediate its ends upon said shaft, a cotter pin in said shaft below said floor, a washer on said shaft between said pin and floor, a spring surrounding said shaft between said floor and pedal, and linkages extending from the ends of said pedal for operating respectively the accelerator valve and the brakes of the vehicle.

3. A mechanism for operating the brakes and accelerator comprising, in a motor vehicle, a slidably mounted shaft in the floor of the vehicle, a tubular head on the upper end of said shaft, a rod loosely mounted in said tube, a bracket over said tube and having downturned ends receiving said rod, a pedal mounted intermediate its ends upon said bracket, stop means on said shaft below said floor, a spring surrounding said shaft between said floor and pedal, and linkages extending from the ends of said pedal for operating respectively the accelerator valve and the brakes of the vehicle.

4. A mechanism for operating the brakes and accelerator comprising, in a motor vehicle, a slidably mounted shaft in the floor of the vehicle, a tubular head on the upper end of said shaft, a rod loosely mounted in said tube, a bracket over said tube and having downturned ends receiving said rod, a pedal mounted intermediate its ends upon said bracket, a cotter pin in said shaft below said floor, a washer on said shaft between said pin and floor, a spring surrounding said shaft between said floor and pedal, and linkages extending from the ends of said pedal for operating respectively the accelerator valve and the brakes of the vehicle.

PAUL MÉNARD.

REFERENCES CITED

The following references are of record in the file of this patent:

UNITED STATES PATENTS

| Number | Name | Date |
|---|---|---|
| 1,527,151 | Davis | Feb. 17, 1925 |
| 2,131,972 | Ruhstorfer | Oct. 4, 1938 |
| 2,258,627 | Siesennop | Oct. 14, 1941 |
| 2,259,774 | Perkins | Oct. 21, 1941 |